US006694104B1

(12) United States Patent
Caplan et al.

(10) Patent No.: US 6,694,104 B1
(45) Date of Patent: Feb. 17, 2004

(54) VARIABLE-RATE COMMUNICATION SYSTEM WITH OPTIMAL FILTERING

(75) Inventors: David O. Caplan, Concord, MA (US); Mark L. Stevens, Pepperell, MA (US); Don M. Boroson, Needham, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/261,628

(22) Filed: Mar. 3, 1999

Related U.S. Application Data
(60) Provisional application No. 60/076,732, filed on Mar. 4, 1998.

(51) Int. Cl.[7] ............................................. H04B 10/04
(52) U.S. Cl. ........................ 398/197; 398/140; 375/300
(58) Field of Search ................... 375/295, 353, 375/300; 359/154, 193, 184, 181; 398/197, 186, 189, 140

(56) References Cited

U.S. PATENT DOCUMENTS

| | | | | |
|---|---|---|---|---|
| 4,598,198 A | * | 7/1986 | Fayfield ..................... | 250/205 |
| 4,713,841 A | | 12/1987 | Porter et al. ................ | 455/608 |
| 4,866,738 A | | 9/1989 | Wiesmann et al. ........... | 375/23 |
| 5,048,058 A | * | 9/1991 | Kaleh ........................ | 329/300 |
| 5,541,955 A | * | 7/1996 | Jacobsmeyer ............... | 375/222 |
| 5,666,225 A | * | 9/1997 | Colbourne .................. | 359/578 |
| 5,854,593 A | * | 12/1998 | Dykema et al. ........... | 340/5.25 |

OTHER PUBLICATIONS

R.A. Cilley, "Performance of Optical Receivers in Detection of Variable Duty Cycle Manchester Coded Data" Air Force Institute of Technology, Master of Science Thesis, Dec. 1979.
S.S. Hwang et al., "Asynchronous Multirate Optical Wireless PPM–CDMA in an Indoor Non–Directed Diffuse Channel" *Electronics Letters* 33 (18):1565–1567 (1997).
Y. Yamada et al., "10 Gbit/s Differential Receiver for Large Optical Power Fluctuation" *Electronics Letters* 33 (19):1642–1644 (1997).
Agrawal, Govind P., *Fiber–Optic Communication Systems* title–copyright, 86–93, and 132–133 (John Wiley & Sons, Inc. 1997).
Caplan, D.O. et al., "High–Sensitivity Variable–Rate Transmit/Receive Architecture," IEEE 297–302 (1999).

(List continued on next page.)

*Primary Examiner*—Jason Chan
*Assistant Examiner*—Christina Y Leung
(74) *Attorney, Agent, or Firm*—Testa, Hurwitz & Thibeault, LLP

(57) ABSTRACT

A variable-bit-rate communication system is described. The communication system includes a variable-bit-rate transmitter that generates digital data at a first or a second bit rate and a variable-bit-rate receiver that receives the digital data. The digital data comprises a sequence of signaling waveforms having a first or a second duty cycle, respectively, wherein each signaling waveform has the same shape.

29 Claims, 15 Drawing Sheets

OTHER PUBLICATIONS

Chinn, Stephen R. et al., "Sensitivity of Optically Preamplified DPSK Receivers with Fabry–Perot Filters," 14 *Journal of Lightwave Technology* No. 3, pp. 370–376 (Mar. 1996).

Hecht, Eugene, *Optics* title–copyright and 576–593 (Addison–Wesley Publishing Co. 1987).

Humblet, Pierre A., "Design of Optical Matched Filters," IEEE Globecom 1246–1250 (1991).

Humblet, Pierre A. et al., "On the Bit Error Rate of Lightwave Systems with Optical Amplifiers," 9 *Journal of Lightwave Technology* No. 11, pp. 1576–1582 (Nov. 1991).

Livas, J. C., "High Sensitivity Optically Preamplified 10 Gb/s Receivers," *Proceedings of the Optical Fiber Communication 1996 Conference* (Optical Society of America).

Stein, Seymour et al., *Modern Communication Principles with Application to Digital Signaling* title–copyright and 256–263 (McGraw Hill Book Co. 1967).

Van Trees, Harry L., *Detection, Estimation, and Modulation Theory, Part I: Detection, Estimation, and Linear Modulation Theory* title–copyright, 226–227, and 248–249 (John Wiley & Sons, Inc. 1968).

* cited by examiner

VARIABLE-RATE COMMUNICATION SYSTEM WITH OPTIMAL FILTERING

GOVERNMENT SUPPORT

This invention was made with government support under Contract Number F19628-95-C- 0005 awarded by the U.S. Air Force. The government has certain rights in the invention.

FIELD OF THE INVENTION

The invention relates generally to the field of optical communications. In particular, the invention relates to a variable-bit-rate optical communication system and to methods of operating a variable-bit rate optical communication system with nearly optimum filtering.

BACKGROUND OF THE INVENTION

Conventional communication systems are typically peak power limited or based on peak power limited designs. In operation, these systems maximize transmitted power by modifying the pulse width for each particular bit rate while maintaining a constant duty cycle.

FIG. 1 illustrates a prior art method of increasing the energy-per-bit in a peak power limited multi-rate communication system. In this prior art method, the pulse width changes in proportion to the repetition rate so that the duty cycle remains at a constant value. The maximum peak output power is limited regardless of the average power transmitted. Consequently, it is advantageous to use modulation formats that maximize the power on-to-off duty cycle. In the method of FIG. 1, the duty cycle is 50%, which is typical for on-off key (OOK) communication systems. The energy-per-bit is increased by increasing the period from 0.1 to 1.0.

It is difficult to achieve optimum performance with peak power limited multi-rate communication systems. In order to achieve optimum or matched performance in these prior art peak power limited multi-rate communication systems, the receivers of these systems must have a sinc( ) transfer function (i.e. the Fourier transform of the transmitted rectangular pulse). Presently, optical sinc( ) filters are not commercially available. Furthermore, the receivers must have a different receiver filter for each bit rate to allow the receiver to remain matched to each specific transmitted pulse shape. Using different filters for each bit rate would greatly increase the cost and complexity of the multi-rate communication system.

SUMMARY OF THE INVENTION

It is therefore an object of this invention to achieve optimum or matched performance in a variable-rate communication system. It is another object of this invention to provide a variable-rate communication system having bandwidth-on-demand or fall-back modes for communications over a noisy or uncertain channel. It is another object of this invention to provide an optical filter that generates a double pass Fabry-Perot transfer function.

It is another object of this invention to provide a method of reducing a bit error rate of a digital communication system operating in a noisy channel. It is another object of this invention to provide a method of reducing intersymbol interference in a communication system.

It is another object of this invention to provide a method of optimizing variable-bit-rate communications. It is another object of this invention to provide a method of performing optimal communications at one or multiple data rates using spectral or symmetric filtering. It is another object of this invention to provide a method of optimizing a modulator extinction ratio in a communication system.

The present invention applies to all types of communication systems including RF, microwave, and optical systems. The present invention applies to communication systems operating at one or multiple data rates.

A discovery of the present invention is that multi-rate communications can be efficiently achieved in a communication system that employs average power limited amplifiers, such as an Erbium-Doped Fiber Amplifier (EDFA), operating in saturation.

Another discovery of the present invention is that near optimum (matched) filtering can be achieved in a communication system employing an Average Power Limited (APL) amplifier operating in saturation and employing spectral or symmetric filtering. In such systems, the pulse shape of the communication signal can be adjusted prior to the APL amplifier so that the transmitted signal is matched to the receiver thereby maximizing the received energy-per-bit, without sacrificing transmitted power.

Another discovery of the present invention is that a variable rate communication system employing an average power limited amplifier operating in saturation and employing PPM signaling can provide near quantum limited performance.

In one embodiment, the present invention features a variable-bit-rate communication system that includes a variable-bit-rate transmitter which generates digital data having a bit rate. The digital data comprises a sequence of signaling waveforms having a duty cycle, where each signaling waveform has the same shape. The sequence of signaling waveforms is transmitted across a channel. The channel may be any communication channel such as free space or a fiber channel.

In another embodiment, the present invention features a variable-bit-rate communication system that includes a variable-bit-rate transmitter which generates digital data having at least a first and a second bit rate. The digital data comprises a sequence of signaling waveforms having at least a first and a second duty cycle, respectively, where each signaling waveform has the same shape. The amplified sequence of signaling waveforms is transmitted across a channel. The channel may be any communication channel such as free space or a fiber channel.

In one embodiment, the transmitter is substantially average power limited. The transmitter includes an optical average power limited amplifier that in one embodiment is an Erbium-doped fiber amplifier. The optical average power limited amplifier is operated in saturation so that each signaling waveform has a maximum power that is determined by an average power limit of the amplifier and the duty cycle of the waveform. The amplitude of each signaling waveform is inversely proportional to its duty cycle.

A variable-bit-rate receiver receives the digital data generated by the transmitter and transmitted across the channel. The receiver typically includes an optical pre-amplifier that amplifies the digital data. The receiver also includes a receiver filter that in various embodiments may be a Fabry-Perot, interference, Bragg grating, or a multi-pass optical filter such as a multi-pass Fabry-Perot optical filter. In one embodiment, the receiver filter has a transfer function that is substantially equal to the net transmitter transfer function (or the conjugate match of the net transmitter transfer function) so as to spectrally and temporally match the transmitter and the receiver. A detector detects digital data received by the receiver.

BRIEF DESCRIPTION OF THE DRAWINGS

This invention is described with particularity in the appended claims. The above and further advantages of this invention may be better understood by referring to the following description taken in conjunction with the accompanying drawings, in which:

DETAILED DESCRIPTION

Figure 1:
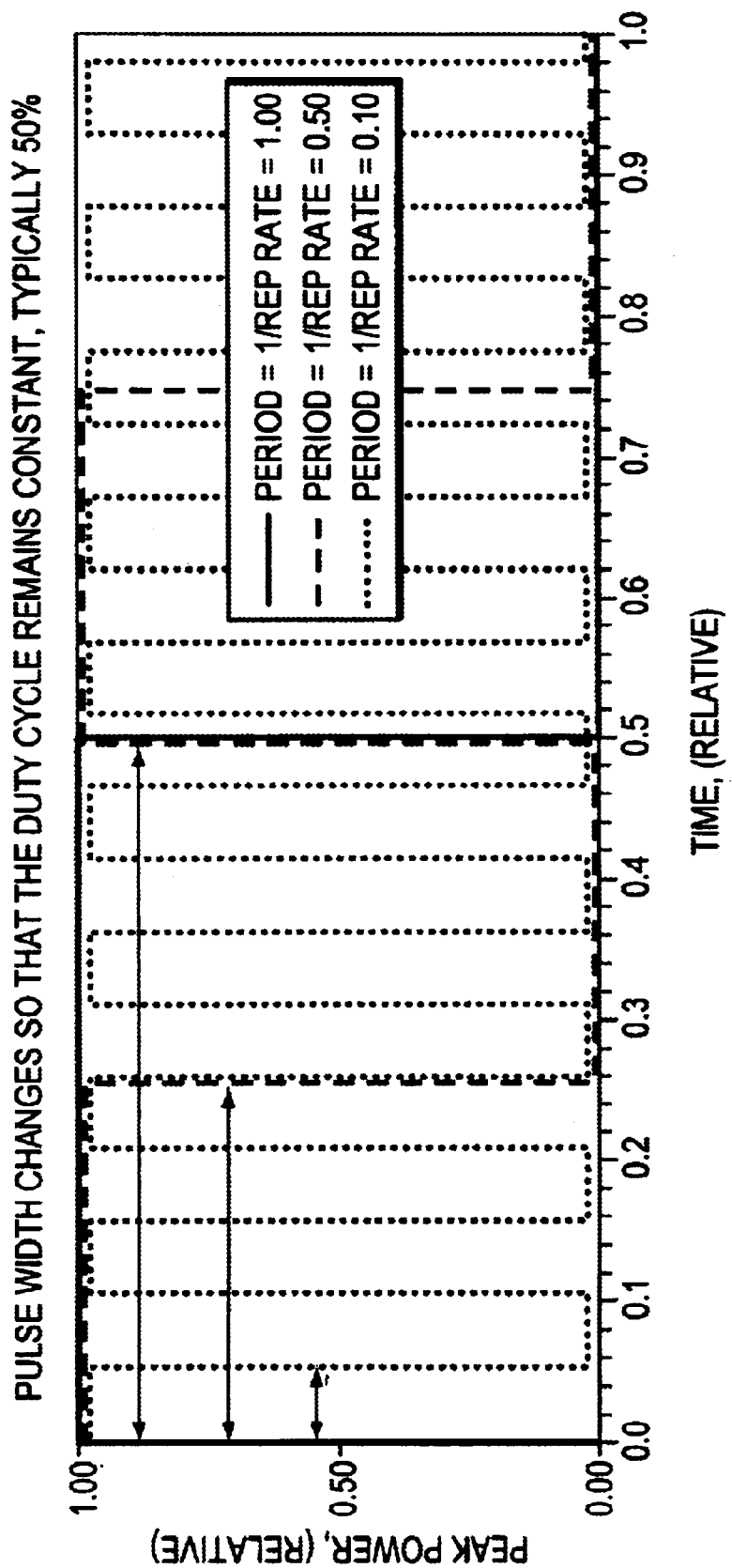
FIG. 1 illustrates a prior art method of increasing the energy-per-bit in a peak power limited multi-rate communication system.
Figure 2:
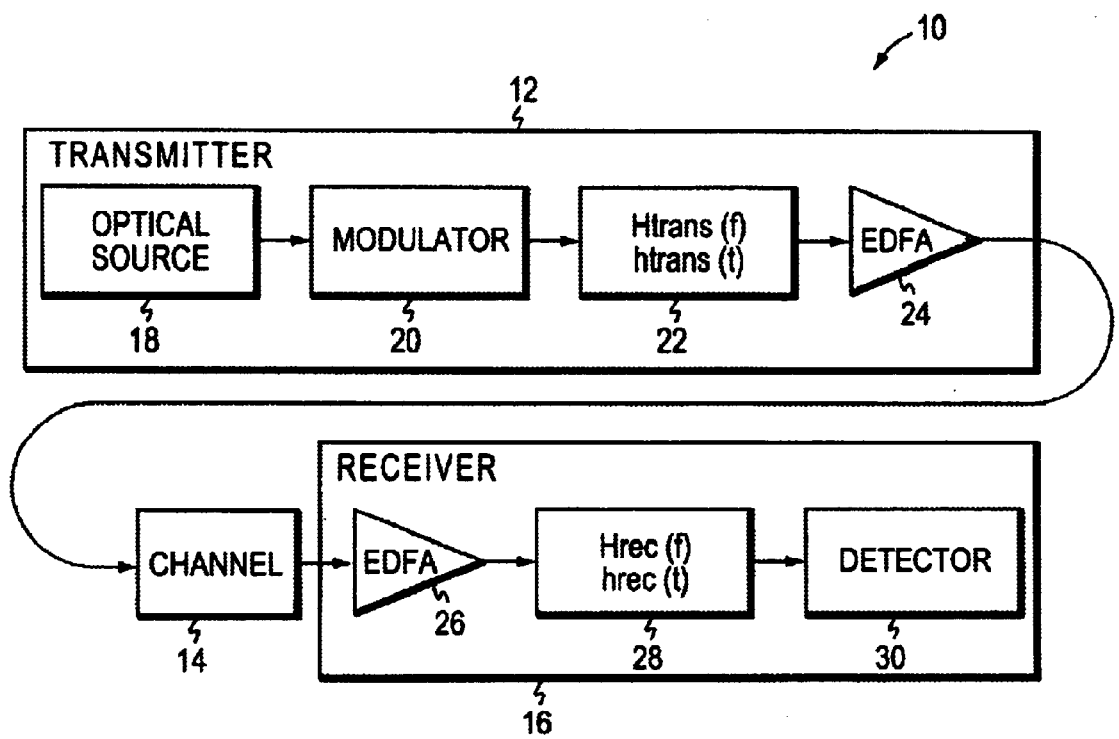
FIG. 2 illustrates a functional block diagram of one embodiment of a communication system that includes spectral filtering according to the present invention.

FIG. 2 illustrates a functional block diagram of one embodiment of a communication system 10 that includes spectral filtering according to the present invention. The communication system 10 includes a transmitter 12, a channel 14, and a receiver 16. The transmitter 12 includes an optical source 18, such as a CW or short pulse laser. A modulator 20 modulates the beam generated by the optical source 18.

In one embodiment, the modulator 20 is a wide-band modulator that generates a digital data signal comprising a sequence of signaling waveforms having a duty cycle and a bit rate. In another embodiment, the modulator 20 generates a digital data signal comprising a sequence of signaling waveforms having at least a first and a second duty cycle and at least a first and a second bit rate, respectively. Typically, each signaling waveform has a predetermined shape. In one embodiment, the sequence of signaling waveforms comprise m-ary pulse position modulation data.

A transmitter filter 22 processes the modulated beam. The transmitter filter 22 is typically a Fabry-Perot, interference, Bragg grating, or a multi-pass optical filter such as a multi-pass Fabry-Perot optical filter. In one embodiment, the transmitter filter 22 is chosen to spectrally and temporally match the transmitter 12 to the receiver 16. There are numerous methods known in the art of matching the transmitter to the receiver. For example, the transfer function of the transmitter filter 22 may be chosen to be approximately equal to the net transfer function of the receiver 16, in the case where the modulator 20 bandwidth and channel 14 bandwidth are much greater than the bandwidth of the transmitter filter 22. In another embodiment, the net bandwidth of the modulator 20, transmitter filter 22 and the channel 14 together is chosen to be approximately equal to the net bandwidth of the receiver 16.

Figure 3:
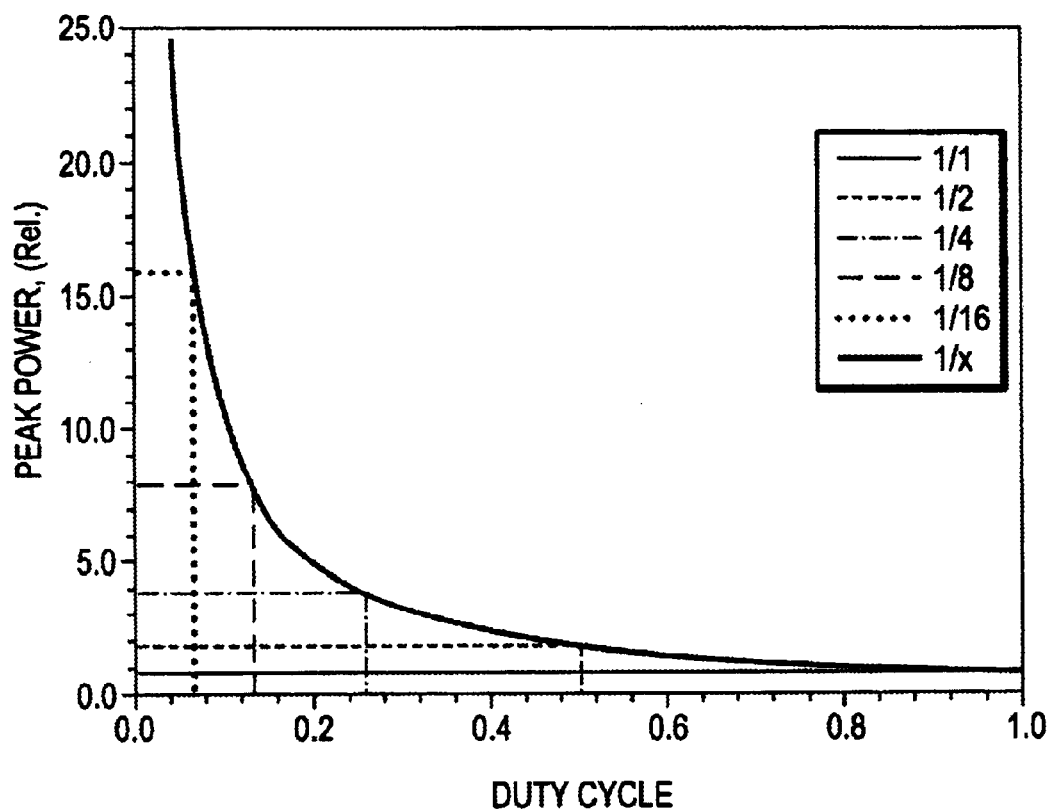
FIG. 3 illustrates the relationship between peak power and duty cycle for an average power limited amplifier.

A transmitter amplifier 24 amplifies the filtered modulated beam. The transmitter amplifier 24 is an average power limited amplifier that operates in saturation. FIG. 3 illustrates the relationship between peak power and duty cycle for an average power limited amplifier. As illustrated in FIG. 3, as the duty cycle decreases, the peak power increases so that the average power is maintained at a constant value (which is unity in FIG. 3).

In one embodiment, the transmitter amplifier 24 comprises an Erbium-doped fiber amplifier (EDFA). The optical source is chosen to generate sufficient optical average power so that the input power to the transmitter amplifier 24 is greater than the saturation input power. For example, if the transmitter amplifier 24 is an EDFA, the required average power generated by the optical source 18 is approximately a few tens of $\mu W$.

The channel 14 carries the beam generated by the transmitter 12. The channel 14 may be any communication channel such as an optical fiber channel, waveguide channel or free space. The receiver 16 receives the beam transmitted through the channel 14. A receiver amplifier 26 amplifies the received beam. The gain of the receiver preamplifier is chosen such that the noise figure of the preamp is not degraded by post detection electronics.

A receiver filter 28 processes the received beam and a detector 30 detects the filtered beam. The receiver filter 28 is typically a Fabry-Perot, interference, Bragg grating, or a multi-pass optical filter such as a multi-pass Fabry-Perot optical filter. In one embodiment of the invention, the transfer function of the receiver filter 28 is chosen such that the receiver 16 spectrally and temporally matches the transmitter 12. Optimum performance can be attained from the communication system 10 by using a transmitter 22 and receiver filter 28 that are designed to generate symmetric waveforms in time. Any filter that generates a symmetrical time waveform (such as a weakly reflecting Bragg grating) can be used. However, even non-symmetric filters, such as the commonly used Febry-Perot can be used. Currently available filters (such as Fabry-Perot filters) do not generate perfectly symmetric waveforms. However, as described herein, near optimum performance can be attained by cascading a plurality of transmitter and receiver filters that generate non-symmetric waveforms. Repeated filtering will result in the generation of progressively more symmetric waveforms.

Figure 4:
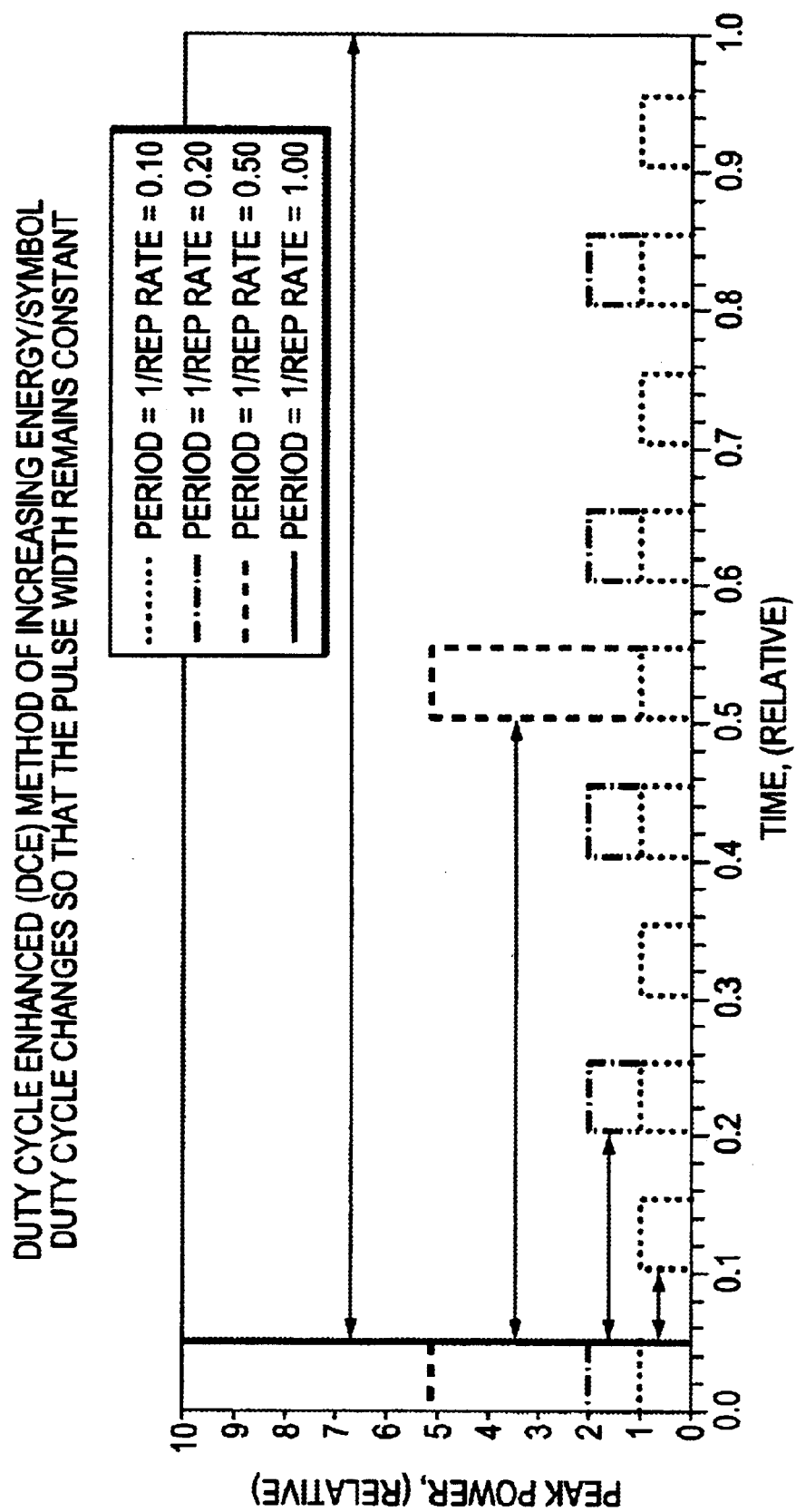
FIG. 4 illustrates the Duty Cycle Enhanced (DCE) or Reduced Duty Cycle (RDC) method of operating the communication system of FIG. 2.

FIG. 4 illustrates the Duty Cycle Enhanced (DCE) method of operating the communication system 10 of FIG. 2 according to the present invention. The DCE method is also defined herein as the Reduced Duty Cycle (RDC) method. In the DCE method, the transmitter 12 operates in an average power limited state. Also, in the DCE method, the pulse width remains constant as the duty cycle changes. The DCE method is characterized by the fact that as the bit rate is reduced, the amplitude increases thereby increasing the energy-per-bit. In the examples shown in FIG. 4, the average area under each waveform is a constant equal to 0.5 while the period is changed from 0.1, 0.2, 0.5 to 1.0.

There are numerous advantages of the DCE method of the present invention. Using the DCE method, all types of pulses (i.e. square NRZ, RZ, rounded, or triangular pulses) will be transmitted and received with the maximum energy-per-bit for a particular bit rate. This is because the transmitter amplifier 24 operates in saturation and, therefore, all available power will be converted to the amplified signals. The resulting output energy-per-bit from the transmitter amplifier 24 and arriving at the receiver 16 is constant regardless of the input pulse shape. Thus, assuming that the communication system 10 has perfect extinction (i.e. transmitted power in the off state is equal to zero), all types of pulses will be transmitted and received with the maximum energy-per-bit for a particular bit rate.

Another advantage of the DCE method of the present invention is that optimum receiver sensitivity for variable bit rates can be achieved without changing the receiver filtering. This is because the transmitted pulse width and the average power remain constant regardless of duty cycle. A communication system employing the DCE method, therefore, can employ aggressive filtering in the transmitter 12 in order to achieve optimum receiver sensitivity at one rate, and will work equally well at other rates by simply varying the duty cycle.

Another advantage of the DCE method of the present invention is that it can be used to reduce bit error rate in a variable-rate communication system. A communication system according to the present invention can be configured for providing bandwidth-on-demand or fall-back modes for communicating over a noisy or uncertain channel. According to the invention, the signal-to-noise ratio is improved by lowering the bit rate while maintaining the same pulse shape and width (i.e., by reducing the duty cycle). Because the system is average power limited, the transmitted energy-per-bit increases thereby lowering the bit error rate.

For example, a method of reducing the bit error rate of a digital communication system according to the present invention includes providing a variable-bit-rate average power limited transmitter operating in saturation. The transmitter generates digital data comprising a sequence of signaling waveforms having a first duty cycle and a first bit rate. Each signaling waveform has a predetermined shape and an amplitude that is inversely proportional to its duty cycle. The modulation format may be m-ary pulse position modulation (M-PPM) as well as other formats such as on-off keying (OOK) and differential phase shift keying (DPSK).

If it is determined that the bit error rate of the digital communication system exceeds a predetermined value, the transmitter can generate digital data comprising a sequence of signaling waveforms having a second duty cycle and a second bit rate, where the second bit rate is lower than the first bit rate. Each signaling waveform has a predetermined shape and an amplitude that is inversely proportional to its duty cycle.

The digital data generated by the transmitter is transmitted through a medium such as free space or a fiber channel to a variable-bit-rate receiver. The receiver may be spectrally and temporally matched to the transmitter. If the bit error rate has exceeded the predetermined value, the receiver can receive the digital data comprising the sequence of signaling waveforms having the second duty cycle and the second bit rate. According to the present invention, since the second duty cycle is less than the first duty cycle, the transmitted energy-per-bit increases and, consequently, the bit error rate is reduced. This method may be repeated for a third and fourth duty cycle, or as many duty cycles as necessary, to reduce the bit error rate to an acceptable level. This method is particularly useful for operating in a noisy or changing channel.

Another aspect of the present invention is that nearly optimum variable-rate optical communications can be achieved in practice by combining the DCE method of the present invention with symmetric filtering (SF) that spectrally and temporally matches the receiver 16 to the transmitter 12. In order to achieve symmetric filtering, the transfer functions of the transmitter filter 22 and the receiver filter 28 are chosen to be conjugate matches of each other. Due to the properties of the APL transmitter, such matching of the transmitter to the receiver can be achieved without sacrificing transmitted power.

Any method of symmetric filtering known in the art may be used in a communication system of the present invention. In one embodiment of the invention, symmetric filtering is achieved by using a transmitter 22 and a receiver filter 28 that are temporally symmetric (i.e. $h(t)=h(-t)$) and by using a symmetric time domain communication signal. By using the same or similar symmetric filters in the transmitter and the receiver, nearly matched filtering is achieved. An example of temporally symmetric filters are weak fiber Bragg grating filters. The modulator 20 may also be used to perform pulse shaping. In one embodiment, a strong fiber Bragg grating can be used to generate symmetric waveforms.

A method for optimizing variable-bit-rate communications in a digital communication system by combining the DCE method with symmetric filtering according to the present invention includes providing a variable-bit-rate average power limited transmitter operating in saturation. The transmitter generates digital data comprising a sequence of signaling waveforms at a first or a second bit rate corresponding to a first or a second duty cycle, respectively. Each signaling waveform has a predetermined shape and an amplitude that is inversely proportional to its duty cycle. The modulation format may be m-ary pulse position modulation.

The digital data is received with a variable-bit-rate receiver. The receiver comprises a receiver filter that has a transfer function which is substantially equal to a conjugate match of the net transfer function of the transmitter thereby spectrally and temporally matching the transmitter to the receiver. This allows the receiver to receive the digital data with optimum sensitivity.

In practice, it is difficult to achieve perfect symmetric filtering. Near optimal performance, however, can be achieved by using commonly available nonsymmetrical filters such as Fabry-Perot optical filters for the transmitter 22 and the receiver filter 28. The predicted performance for a communication system using such a filter is approximately 3 dB below the optimum performance. This performance is comparable to state-of-the art communication systems. In one embodiment, electrical filters are used in addition to the nonsymmetrical optical filters to improve the performance.

In another embodiment, nonsymmetrical optical filters, such as Fabry-Perot filters, are cascaded together to produce a more symmetric filter. The net transfer function of cascaded identical nonsymmetric filters will be a convolution of the transfer functions of the identical filters, which is a more symmetrical, slightly broader transfer function.

For example, a double-pass Fabry-Perot filter will result in performance that is approximately 1 dB below optimum. A triple-pass Fabry-Perot filter will result in performance that is approximately 0.6 dB below optimum. As additional nonsymmetrical filters are cascaded, the time domain signal becomes increasingly symmetric and, consequently, the departure from the optimum continues to diminish. The performance of a communication system employing this embodiment, compares favorably with theoretical predictions for state-of-the art communication systems using combined optical and electrical filtering. Even where symmetrical filtering is not used explicitly in the transmitter, commonly transmitted waveforms, such as return-to-zero (RZ) or non-return-to-zero (NRZ) pulses, are symmetric. Therefore, using more symmetrical receiver filters results in better matching and improved performance.

Figure 5:
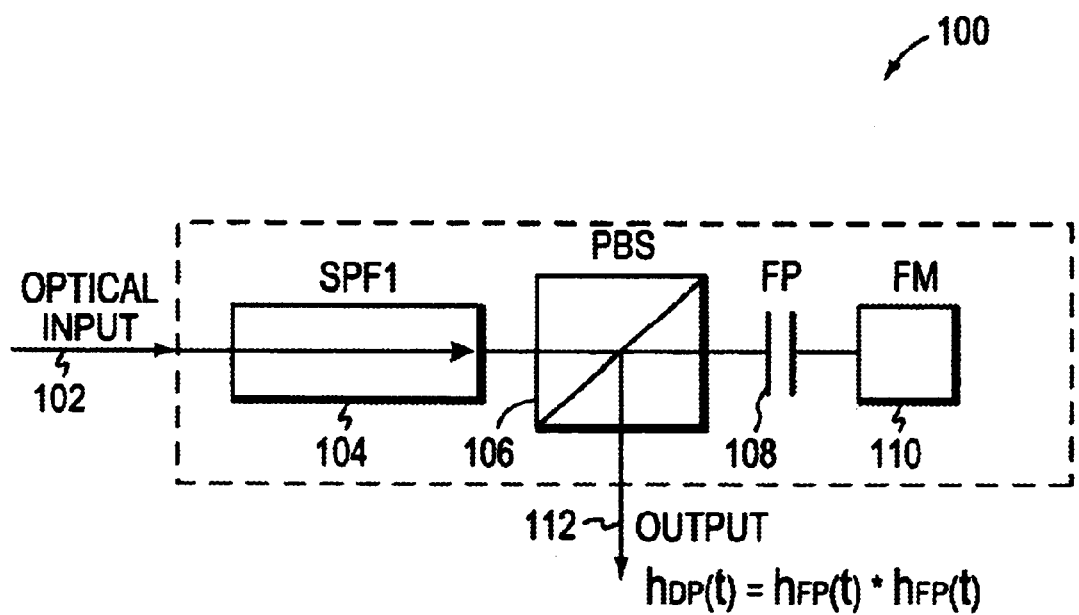
FIG. 5 illustrates an embodiment of a double-pass Fabry-Perot filter that can be employed in the communication system of FIG. 2.

FIG. 5 illustrates an embodiment of a double-pass Fabry-Perot filter 100 that can be employed in the communication system 10 of the present invention as the transmitter filter 22 and the receiver filter 28. The filter 100 includes an input optical fiber 102 that accepts an optical signal beam and directs it to a single polarization fiber isolator 104. The resulting polarized optical signal beam is directed to a polarization beam splitter 106. The beam splitter 106 transmits the polarized optical signal beam to a Fabry-Perot filter 108. The filtered signal beam is then directed to a Faraday mirror 110.

The Faraday mirror 110, which may be a narrow band reflector, changes the polarization of the signal beam and reflects it back to the Fabry-Perot filter 108. The doubly filtered signal beam is then directed back to the polarization beam splitter 106. The beam splitter 106 directs the doubly filtered signal beam, with its changed polarization, to an output 112 of the filter 100.

The resulting filtered optical signal beam has a more symmetric waveform. Applicants predict that using such a filter in the communication system of the present invention will result in performance that is approximately 1 dB below optimum performance. This type of filter is particularly well suited for use in a dense wavelength division multiplexing (WDM) communications systems because of its narrow bandwidth and tuning capability.

The double-pass Fabry-Perot filter 100 of FIG. 5 has numerous advantages. One advantage is that it uses only one Fabry-Perot filter. This guarantees that the transfer functions for the forward and backward pass of the filter are identical. Such a design is equivalent to cascading two identical filters. Another advantage of the filter is that is has a narrower pass-band compared with a single pass filter and better rejection between two adjacent WDM channels. Such a filter is particularly useful for polarization maintaining (PM) communication systems since the rejected out-of-band light is reflected back through the PBS and disposed of by the isolator, and the PBS attenuates unpolarized noise (such as amplified spontaneous emission) by 3 dB.

There are numerous other techniques for achieving symmetric filtering. In one embodiment of the invention, symmetric filtering is achieved by using transmission filters that comprise interference filters. In another embodiment, symmetric filtering is achieved by using single-mode reflectors and circulators. The single-mode reflectors may be dielectric mirrors or fiber Bragg gratings (FBG's). Since these reflectors also perform spectral shaping, they can be used to generate well defined (and potentially very narrow) spectral characteristics, as well as symmetric waveforms in time.

The DCE/SF method of the present invention has numerous advantages over the prior art. The DCE/SF method allows shaping of the pulse and/or the channel dispersion profile to simultaneously optimize both channel transmission and detection sensitivity at variable bit rates. Thus, the DCE/SF method is particularly well suited for high-speed dispersion managed networks.

Moreover, the DCE/SF method simplifies the design of optical communication systems by eliminating the need for some components such as electrical filters. The DCE/SF method of the present invention also provides the capability for bandwidth-on-demand and graceful degradation in the presence of a noisy channel or deteriorating components, extending the useful lifetime of the communication system. Thus, the DCE/SF method of the present invention is particularly well suited for space communications where simplicity and robust performance are essential.

The methods of the present invention can be applied to other communication formats, such as OOK, PSK, DPSK, and M-PPM. Many optical communication systems use simple on-off key (OOK) signaling because the transmitter and receiver hardware are relatively simple and because these systems typically operate at high signal-to-noise ratios and have small dynamic range requirements. The decision threshold for optimum performance of OOK is a variable depending on the received signal power, the extinction ratio (power ratio of a logical 1 compared to a 0) of the transmitter, and the details of the filtering in the receiver.

Some optical communication systems, such as free-space communication systems, require receivers to operate over large dynamic ranges. OOK signaling in these systems may require more complicated threshold setting algorithms to maintain the optimum receiver sensitivity. Therefore, these systems typically use a signaling format, such as antipodal or orthogonal signaling that inherently establishes their own decision threshold.

Phase-shift key (PSK) modulation is a common antipodal signaling scheme, which is not often used in optical communication systems because the phase noise inherent in typical optical sources makes the reconstruction of a reference carrier at the receiver difficult and costly. Frequency shift key (FSK) is a common orthogonal signaling technique in microwave communication systems, however it is also difficult and costly to implement in an optical communication system.

Pulse-Position Modulation (PPM) is another orthogonal signaling technique. PPM communication systems typically use the same transmitter and receiver hardware as OOK systems. The signaling waveforms for binary PPM are equivalent to Manchester encoded OOK. PPM signaling waveforms are biphase and they provide their own threshold by comparing energy received in one time slot to another. PPM communication systems typically have a wider channel bandwidth and/or a reduced data rate when compared with OOK systems. Nevertheless, most optical communication systems have more than enough channel bandwidth to support PPM communications.

Figure 6:
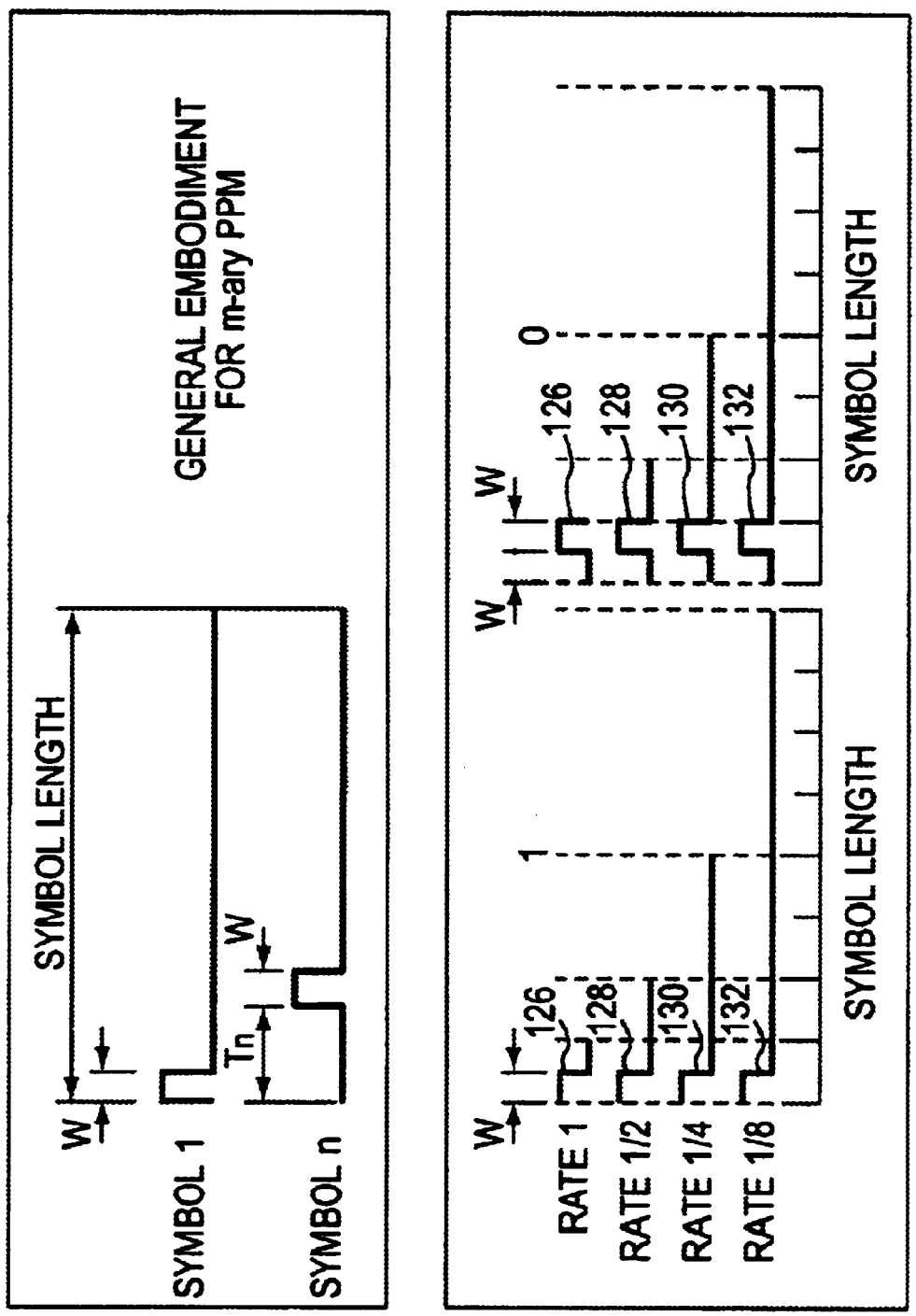
FIG. 6 illustrates Pulse Position Modulation (PPM) signaling waveforms at multiple data rates.

FIG. 6 illustrates PPM signaling waveforms at multiple data rates in a preferred embodiment of the present invention . The general case for m-ary PPM requires that the pulse width "w" be fixed and constant for all symbols and all data rates. This feature is advantageous because a single receiver filter can provide optimum sensitivity at all data rates. The general case for m-ary PPM also requires that each symbol has a fixed delay "$T_n$" for all data rates. This feature is advantageous because a single set of delay lines in the receiver can be used to demodulate all data rates.

FIG. 6 shows a preferred embodiment for 2-ary PPM where the delay between symbols is equal to the pulse width "w." This configuration has numerous advantages. For example, the data rate is maximized for a given pulse width. Also, the frequency spectrum has a line at the clock frequency at all reduced data rates that can be used to regenerate bit timing in the receiver as described later in connection with FIGS. 8–10. There is no requirement that the symbol length be an integral number of pulse widths as shown in FIG. 6. In fact, the symbol length, and therefore the data rate, can vary in a continuous manner from "rate 1" to any lower rate.

Although the present invention has been illustrated in connection with PPM signaling waveforms at multiple data rates, numerous other modulation formats are also preferred embodiments. For example, OOK and DPSK modulation formats are preferred embodiments.

Signaling waveforms are illustrated for high or "one" and low or "zero" signals at four different data rates. FIG. 6 illustrates fundamental data rate signals 126, half fundamental data rate signals 128, quarter fundamental data rate signals 130, and eighth fundamental data rate signals 132.

Another aspect of the present invention is that the DCE method can be used with PPM signaling to result in a DCE/PPM communication system that can provide near quantum limited receiver performance at multiple data rates. A DCE/PPM communication system according to the present invention will include a receiver that is matched to the fundamental data rate signals 126. Such a communication system is advantageous because the receiver will also be matched to DCE signaling waveforms at data rates lower than the fundamental data rates.

Figure 7:
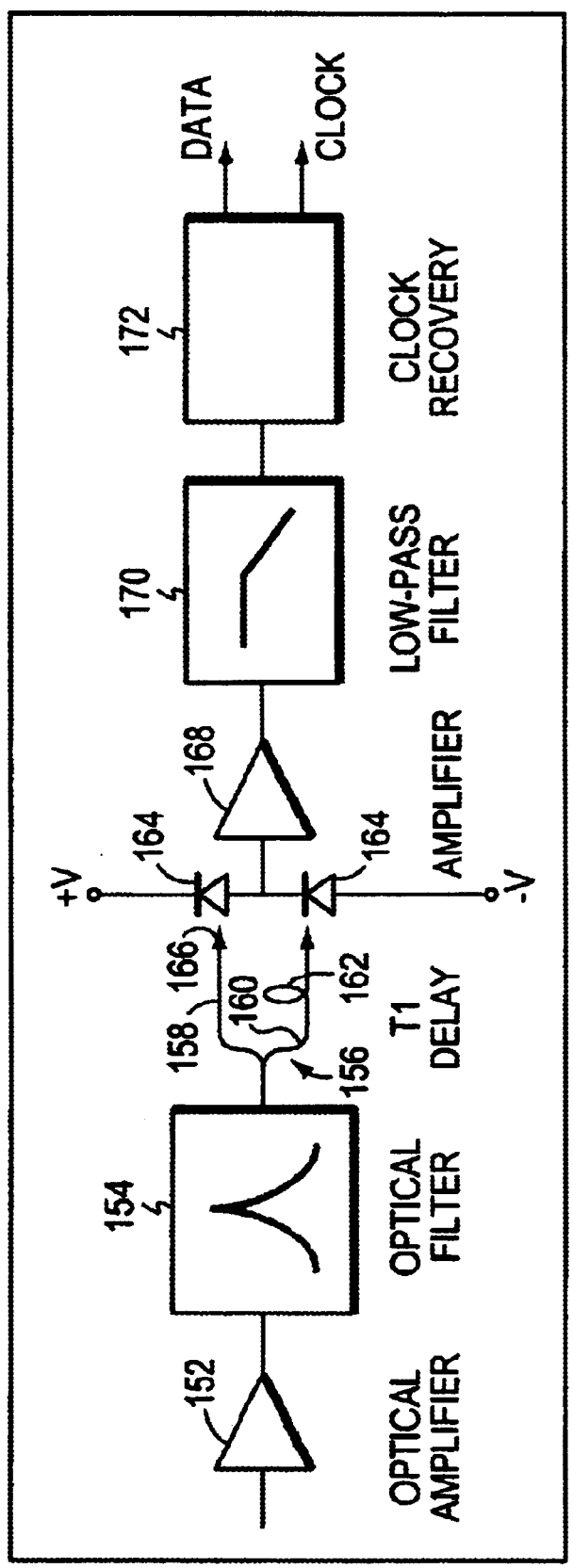
FIG. 7 illustrates an embodiment of a functional block diagram of a receiver for implementing the DCE/PPM communication method according to the present invention.
Figure 8:
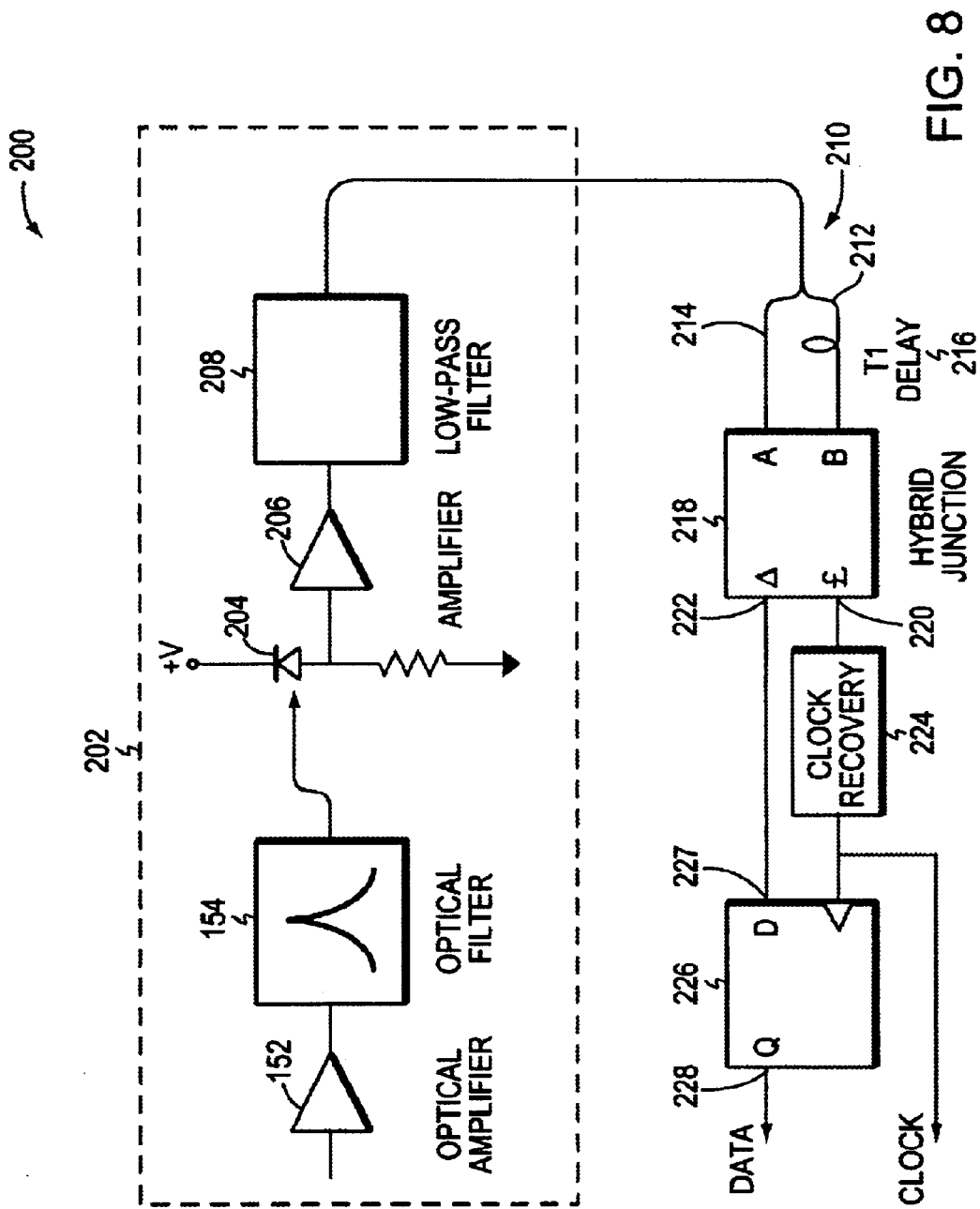
FIG. 8 illustrates a functional block diagram of a receiver for implementing the DCE/PPM communication method and for performing bit-timing recovery according to the present invention.

FIGS. 7 and 8 show two embodiments of the present invention. In FIG. 7, the delay line is implemented optically and the balanced detector arrangement performs a subtraction. FIG. 7 illustrates a functional block diagram of a receiver 150 for implementing the DCE/PPM communication method according to the present invention. A low-noise optical amplifier 152 receives the PPM communication signal. In one embodiment, the amplifier 152 comprises an EDFA.

A receiver filter 154 processes the amplified signal. The filter 154 may be a fiber Fabry-Perot (FFP) filter or a symmetric filter as described earlier. The transfer function of the receiver filter 154 is chosen to match the fundamental PPM signal. The transfer function of the receiver filter 154 may also be chosen to implement the spectral filtering technique described herein.

An optical splitter 156 splits the filtered optical signal into a first 158 and a second optical path 160. A delay element 162 delays the second path 160 by a delay that is equal to the width of the signal pulse (one-half a bit time at the fundamental data rate). In one embodiment, the delay element 162 comprises a differential fiber delay that delays the second path by T1.

A high-speed photodetector 164 is optically coupled to an end 166 of the first 158 and an end 167 of the second optical path 160. In one embodiment, a high-speed photodetector 164 terminates the end of each of a first and a second optical fiber. The photodetectors 164 are configured to perform direct detection of the optical signals transmitted on the first 158 and the second optical path 160 and to subtract the electrical signals generated by the photodetectors 164. An electrical amplifier 168 amplifies the resulting signal generated by the photodetectors 164. A low pass filter 170 processes the detected signal. A clock recovery circuit 172 recovers the received data and the clock signal.

In one embodiment, an average power limited transmitter (not shown) transmits a PPM signaling waveform of the type shown in FIG. 6. Because the transmitter is average power limited, the power of the transmitted signaling waveform is constant regardless of its duty cycle. The peak power of the pulses is, therefore, inversely proportional to the duty cycle of the signaling waveform. The transmitted signaling waveforms are received by the receiver 150. Due to the choice of signaling waveforms, the receiver filter 154 is matched to the signaling waveforms at the fundamental data rate and at multiple data rates below the fundamental data rate. The receiver 150, therefore, provides near ideal performance at variable data rates.

The receiver 150 for implementing the DCE/PPM communication method according to the present invention has numerous advantages. One advantage is that a single matched receiver filter 154 can be used for communicating at variable data rates. Another advantage of the receiver 150 is that it can operate over a wide variety of signal levels and/or rapidly changing signal levels. Another advantage of the receiver 150 is that it can adapt to a variety of channel conditions by modifying the data rate for optimum information transfer. Another advantage of the receiver 150 is that it does not require threshold adjustment. Another advantage of the receiver 150 is that it does not require closed-loop control of the optical path lengths because the detected signals are combined non-coherently.

In yet another aspect of the present invention, a DCE/PPM receiver can be configured to provide bit-timing recovery. FIG. 8 illustrates a functional block diagram of a receiver 200 for implementing the DCE/PPM communication method and for performing bit-timing recovery according to the present invention.

The front end 202 of the receiver 200 is similar to a typical OOK receiver. The front end 202 includes the optical amplifier 152 and the receiver filter 154 of the receiver 150 of FIG. 7. The receiver 200, however, includes only a single detector 204 following the receiver filter 154. An amplifier 206 amplifies the signal detected by the detector 204. A low pass filter 208 processes the detected signal.

A broadband electrical power divider 210 splits the output of the low-pass filter 208 into a first 212 and a second electrical path 214. A differential delay is implemented electrically with a broadband junction hybrid performing the subtraction and addition of the two delayed inputs. A differential delay element 216 is positioned in the first electrical path. In one embodiment, the delay element 216 delays the signaling waveform by a delay that is substantially equal to a pulse duration. The first 212 and second electrical paths 214 are recombined using a broadband hybrid junction 218 that AC couples the signal from the first 212 and the second electrical path 214. The hybrid junction 218 generates a sum signal ($\Sigma$) at a sum port 220 and a difference signal ($\Delta$) at a difference port 222.

In one embodiment, the difference signal carries the signaling waveform and the sum signal is used to derive a phase coherent clock signal for bit timing and regeneration.

The receiver 200 includes a clock recovery circuit 224 that recovers the clock signal from the sum signal generated by the hybrid junction 218 at the sum port 220. The receiver 200 typically includes a latch 226 having a data input 227 electrically coupled to the difference port 222 of the hybrid junction 218. An output port 228 of the latch 226 generates the received data that is synchronized to the recovered clock signal.

In the receiver of FIG. 8, the sum port of the junction hybrid generates a clock signal that is phase coherent with the information carrying waveform out of the difference port. Extraction of the clock signal at the sum port is accomplished using standard techniques, squaring and filtering at the highest data rate, and filtering only at all the lower data rates. The receiver of FIG. 8 has numerous advantages over prior art. One advantage is that the extracted clock signal is phased correctly to provide symbol decisions at all data rates. Prior art clock recovery schemes often contain electrical delays that are matched for a particular data rate, and therefore changing data rate requires changing the delays.

Using the signaling scheme described in FIG. 6, the receivers described in connection with FIGS. 7 and 8 allow multi-rate PPM operation with optimum sensitivity at all data rates with the same fixed optical and low-pass filters and a fixed delay T1 (the delay between symbol pulses shown in FIG. 6). This feature of the invention is advantageous because prior art receivers require unique filters and delays for each data rate.

Figure 9:
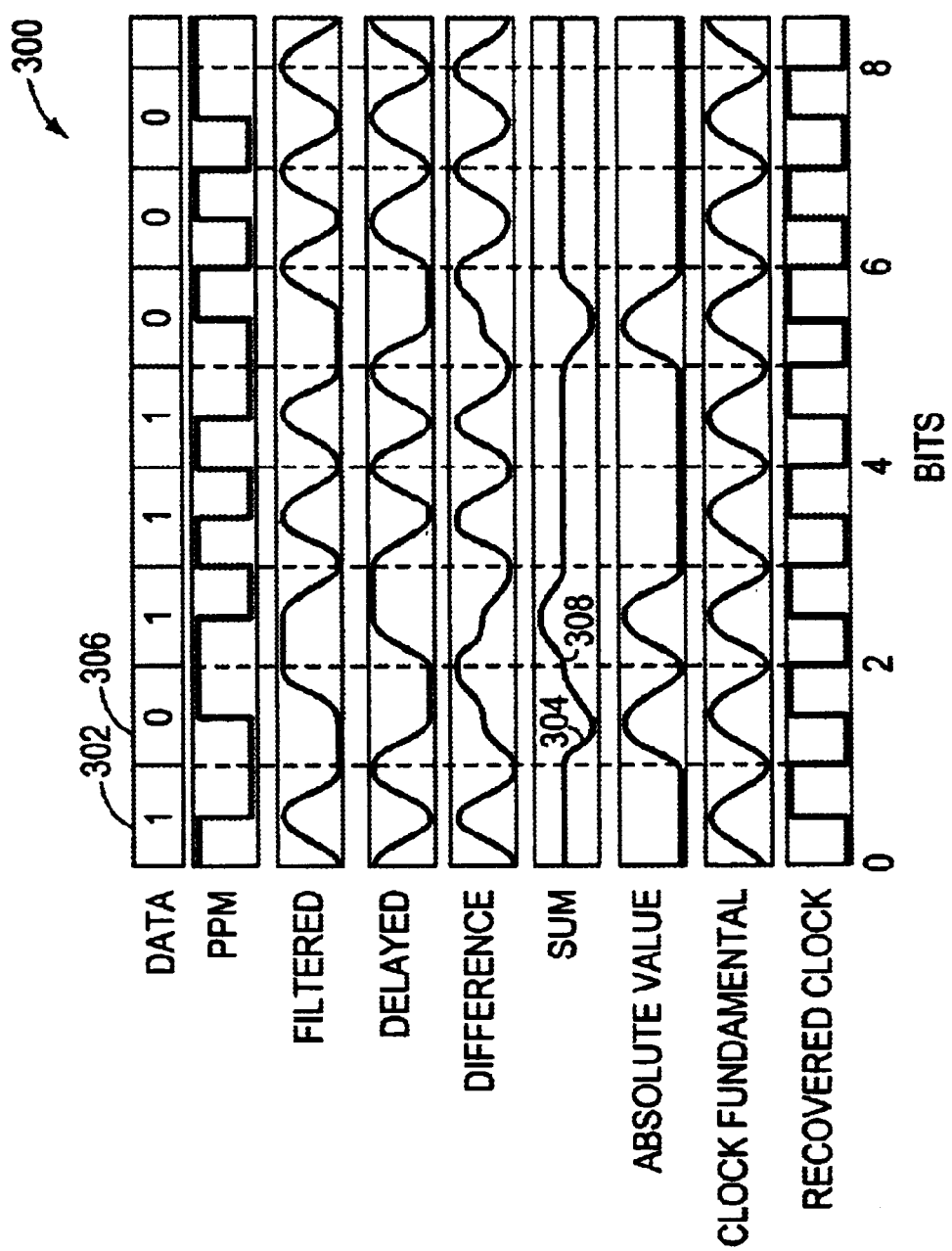
FIG. 9 illustrates bit timing and recovery at the fundamental data rate using the receiver of FIG. 8.

FIG. 9 illustrates a diagram 300 of bit timing and recovery at the fundamental data rate (Rate 1 in FIG. 6) using the receiver 200 of FIG. 8. At the fundamental data rate, the hybrid junction 218 generates at the sum port 220 three possible output waveforms. If the data received by the receiver 200 comprises a string of successive "ones" or "zeros," the hybrid junction 218 generates a constant DC voltage, but, since the hybrid junction 218 is AC coupled, it generates at the sum port 220 a null signal.

If the data received by the receiver 200 comprises a "one" immediately followed by a "zero," 302 the hybrid junction 218 generates a null signal for the width of the signal pulse. But since the hybrid junction 218 is AC coupled, it generates at the sum port 220 a waveform that is a negative pulse 304 having a width equal to that of the signal pulse.

If the data received by the receiver 200 comprises a "zero" followed by a "one," 306 the hybrid junction 218 receives two simultaneous pulses. In response, the hybrid junction 218 generates at the sum port 220 a positive pulse 308 having a width that is equal to the width of the signal pulse.

Therefore, at the fundamental data rate, the hybrid junction 218 generates at the sum port 220 a pulse, which may be positive or negative, whenever there is a bit transition. Thus the pulses generated by the hybrid junction 218 at the sum port 220 produce a signal that identifies the symbol boundaries. The absolute value of the sum-port waveform contains a fundamental component of the bit clock that is correctly phased with the information carrying waveform for optimum bit decisions.

Figure 10:
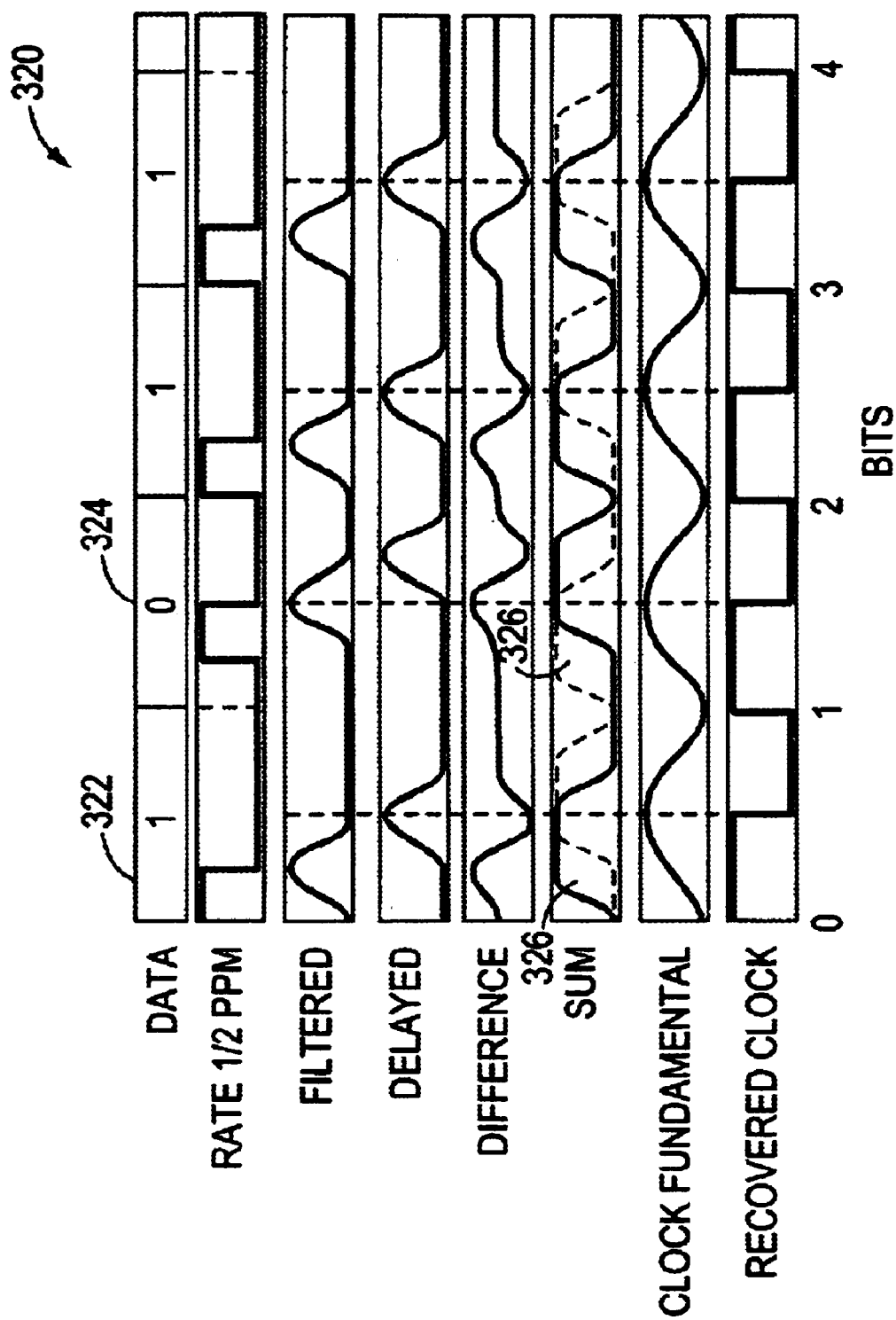
FIG. 10 illustrates bit timing and recovery below the fundamental data rate using the receiver of FIG. 8.

FIG. 10 illustrates a diagram 320 of bit timing and recovery at data rates below the fundamental data rate using the receiver 200 of FIG. 8. FIG. 10 shows bit-timing recovery at half the highest rate (Rate ½ in FIG. 6) and all lower rates. The information carrying waveform is the difference signal, and the clock signal is carried by the sum. The recovered clock signal is precisely aligned with the peaks of the information carrying waveform by virtue of the signaling scheme and hardware configuration of the present invention.

The hybrid junction 218 generates two possible output waveforms at the sum port 220 when bit timing is below the fundamental data rate. If the data received by the receiver 200 comprises a null signal, the hybrid junction 218 generates a null signal at the sum port 220.

If the data received by the receiver 200 comprises either a "one" 322 or a "zero," 324 then the hybrid junction 218 generates at the sum port 220 a positive pulse 326 that has been stretched to twice the length of the original signal pulse. The pulses generated for a one and a zero are offset in time with respect to each other by the width of the signal pulse. If the pulses generated by "ones" and "zeros" are overlaid in time, there would be a partial overlap of the two pulses. Between the pulses the output returns to zero. This is illustrated in FIG. 10 by the solid and dashed lines of the sum-port waveforms. The sum-port waveform contains a fundamental component of the bit clock that is correctly phased with the information carrying waveform for optimum bit decisions.

One advantage of the present invention over prior art is that one clock recovery circuit operates at all data rates with a fixed electrical delay. That is, a communication system according to the present invention is self-synchronizing and provides the proper alignment between clock and the information carrying waveform for optimum bit decisions at all data rates.

Figure 11:
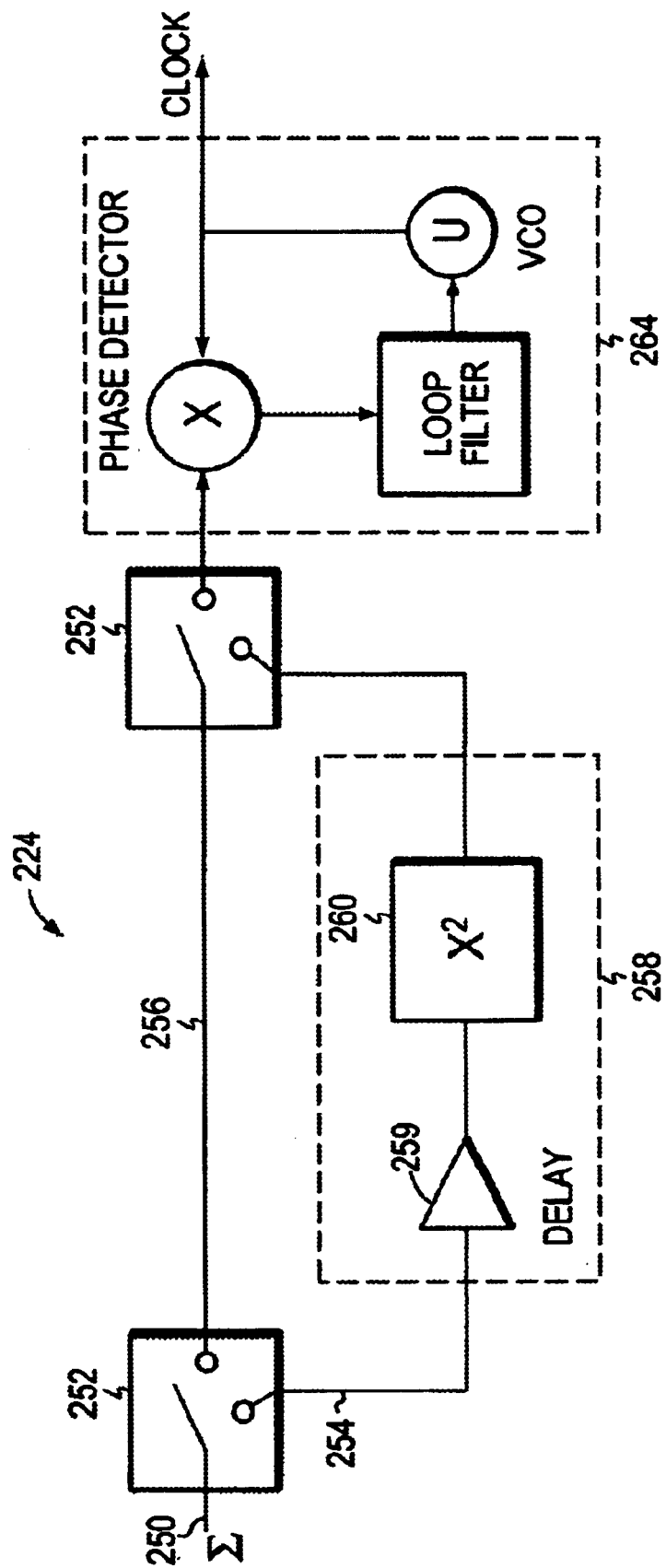
FIG. 11 illustrates a functional block diagram of the clock recovery circuit of FIG. 8 for recovering bit timing at and below the fundamental data rate.

FIG. 11 illustrates a functional block diagram of the clock recovery circuit 224 of FIG. 8 for recovering bit timing at and below the fundamental data rate. An input 250 of the circuit 224 is coupled to the sum port 220 of the hybrid junction 218. A rate sensing circuit 252 determines whether the signal produced at the sum port 220 is at or below the fundamental data rate and directs the signal to a fundamental data rate 254 or other data rate path 256.

If the rate sensing circuit 252 determines that the signal produced at the sum port 220 is at the fundamental data rate, it routes the signal to an absolute value circuit 258 that takes the absolute value of the signal at the fundamental data rate. In one embodiment, the absolute value circuit 258 includes a broadband frequency doubler 260 or a full-wave rectifier 262. The circuit 258 also includes a fixed delay element 259 that delays the signal to align the phase of the recovered clock at the fundamental data rate with the data pulses. A narrow band-pass filter 264 filters the resulting signal.

The absolute value circuit is not required for data rates below the fundamental rate. Therefore, if the rate sensing circuit 252 determines that the signal produced at the sum port 220 is below the fundamental data rate, it routes the signal directly to the narrow-band filter 264 bypassing the absolute value circuit 258.

The narrow band-pass filter 264 in one embodiment is a phase-locked loop. The phase locked loop places the edge of the reconstructed clock at the midpoint of the overlap between the stretched pulses for "ones" and "zeros." This is the same point in time where the data waveforms generated by the hybrid junction at the difference port is at its peak value resulting in substantially optimum phasing between the recovered clock and the data waveforms at all data rates at and below the fundamental rate.

Figure 12:
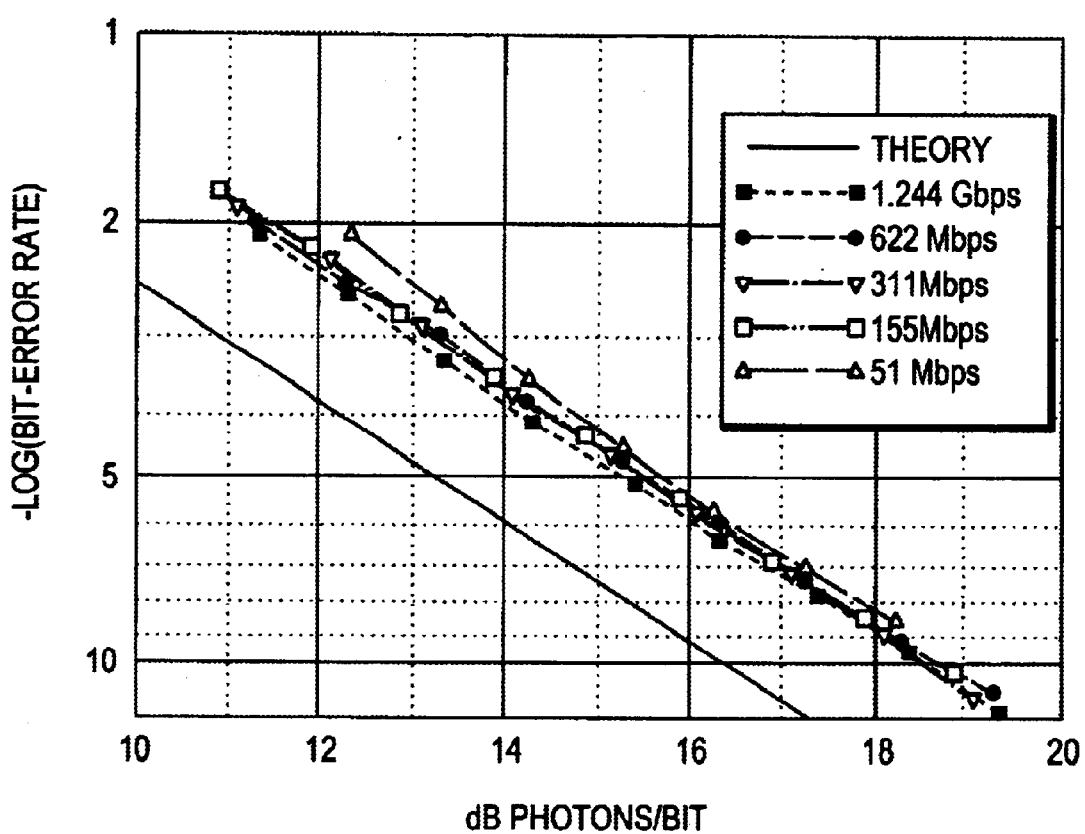
FIG. 12 illustrates experimental Bit Error Rate (BER) measurements as a function of photons per bit for a multiple bit rate optical communication system using the DCE method of the present invention with PPM.

FIG. 12 illustrates experimental Bit Error Rate (BER) measurements for a multiple bit rate optical communication system using the Duty-Cycle Enhanced (DCE) method of the present invention with Pulse Position Modulation (PPM). FIG. 12 presents BER measurements for 5 different bit rates. The BER measurements show a tight cluster of BER curves at the five bit rates. These measurements indicate state-of-the-art receiver sensitivities (approximately 2 dB from the theoretical limit) at all bit rates.

Figure 13:
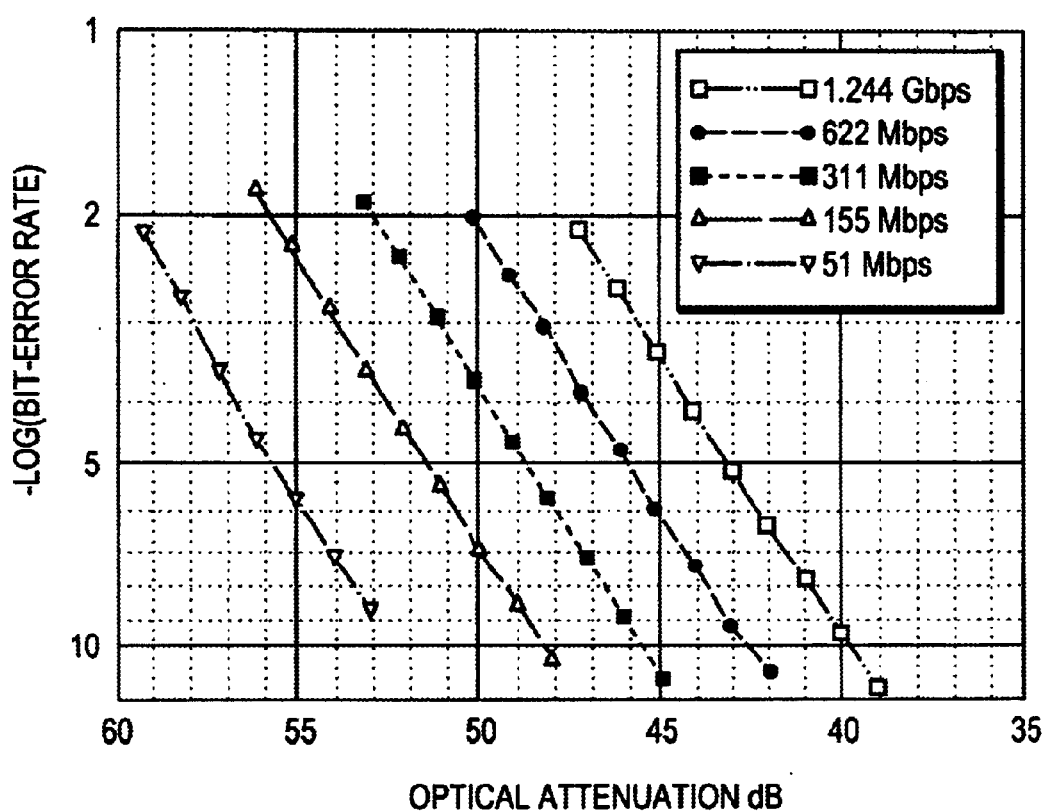
FIG. 13 illustrates experimental BER measurements as a function of channel loss for a multiple bit rate optical communication system using the DCE method of the present invention.

FIG. 13 illustrates experimental BER measurements as a function of channel loss for a multiple-bit-rate optical communication system using the DCE/PPM method of the present invention. FIG. 13 illustrates that as the channel transmission deteriorates, BER performance can be maintained by lowering the bit-rate. For example, as illustrated in FIG. 13, a $10^{-9}$ BER can be achieved with approximately 40.5 dB of channel attenuation at 1.244 Gbps and also with approximately 52.5 dB of channel attenuation at 51 Mbps. Thus a DCE/PPM communication system of the present invention can adjust the bit rate to obtain a desired BER.

In practice, the DCE/PPM method of the present invention is advantageous because with a simple (single) transmitter/receiver design, it can provide the capability to adjust the bit rate for optimal communication for particular channel properties without impacting receiver sensitivity. Also, in practice, the DCE/PPM method of the present invention is advantageous because the effects of inter-symbol interference (ISI), which is dependent on both the channel properties and the signaling waveform, are reduced at lower duty cycles. This is because the distance between signaling waveforms increases as the duty cycle decreases.

Figure 14:
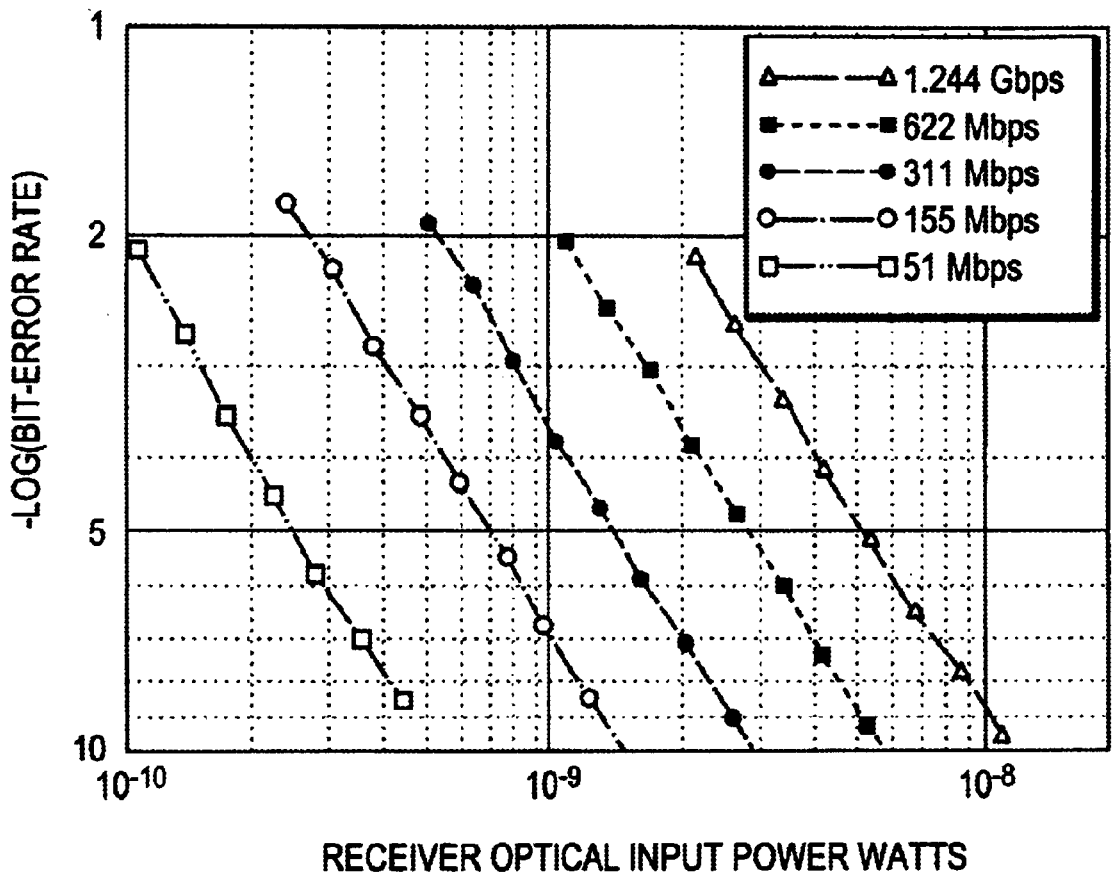
FIG. 14 illustrates experimental BER measurements as a function of receiver optical input power for a multiple bit rate optical communication system using the DCE/PPM method of the present invention.

FIG. 14 illustrates experimental BER measurements as a function of average receiver optical input power for a multiple bit rate optical communication system using the DCE/PPM method of the present invention. FIG. 14 illustrates that the sensitivity to the average received optical power continuously improves as bit rate is lowered. For example, as FIG. 14 illustrates, a $10^{-9}$ BER can be attained with approximately 10 nW of average received optical power at 1.244 Gbps and also with approximately 500 pW ($1/24^{th}$ the amount) at 51 Mbps. The experimental receiver performance illustrated in FIG. 14 at both 1.244 Gbps and 51 Mbps is approximately 2 dB from the calculated theoretical performance.

Thus the DCE/PPM method of the present invention can optimize the data rate to conform to properties of the channel as well as the power limitations of the transmitter. This is an important feature of the present invention because optical nonlinearities, such as stimulated Brillouin (SBS) or Raman (SRS) scattering in fiber, are power dependent. Due to its high receiver sensitivities, the DCE/SF and DCE/PPM methods diminish the impact of these nonlinearities because the communication link can be operated with less transmitted power. In addition, bit rate and transmitted power levels can be adjusted to minimize such effects and optimize overall performance.

The DCE/PPM method of the present invention is particularly useful for performing flexible wavelength division multiplexed (WDM) communications. In WDM systems, multiple signals, each at a distinct wavelength, transmit simultaneously. The power level of each signal must be relatively low in order to keep the total power for all of the signals below the SBS or SRS thresholds ($P_{th}$). Using the DCE/PPM method of the present invention, the transmitted power level and bit rate on each operating wavelength can be adjusted so that the net throughput is maximized, as the number of operational wavelengths varies.

Figure 15:
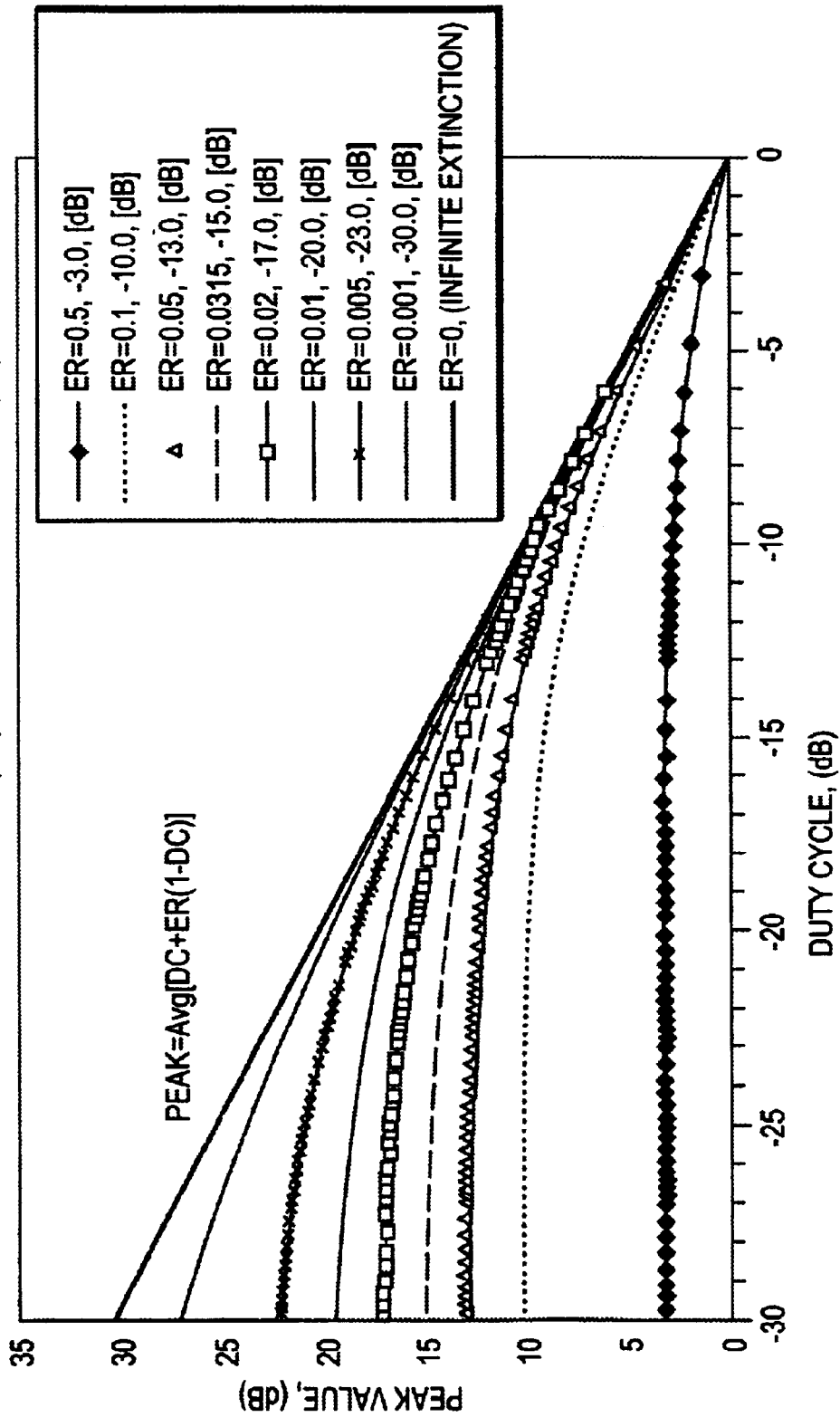
FIG. 15 illustrates peak output power for an Average Power Limited (APL) transmitter as a function of Duty Cycle (DC) and Extinction Ratio (ER).

FIG. 15 illustrates peak output power for an Average Power Limited (APL) transmitter as a function of Duty Cycle (DC) and Extinction Ratio (ER). ER is defined herein as the power off-to-on ratio. ER measurements are typically used for characterization purposes or as a feedback parameter in order to enhance active control for optimizing modulator performance, which directly impacts the communication performance.

The present invention also features a method of optimizing a modulator extinction ratio in a communication system. For systems with finite extinction, the peak output power from the average power limited amplifier is maximized when the extinction ratio is minimized. This effect is exaggerated significantly at low duty cycles, by an amount that is approximately inversely proportional to the duty cycle since, $$P_{peak} = \frac{Paverage}{DC + ER(1-DC)} \overline{\lim DC \to 0} \Rightarrow \frac{Paverage}{ER}$$

Average power limited transmitters often employ modulators (such as Mach-Zehnder modulators) which require active control to minimize the ER, an action which improves receiver sensitivity by increasing the "one" to "zero" distance. Typically ER optimization is accomplished by minimizing the power off transmission. However, for low duty cycle or variable rate APL systems, a more sensitive method of minimizing the ER is to maximize the peak power transmitted since this value becomes increasingly sensitive to ER as the duty cycle is minimized. These properties of an APL transmitter can also be used to accurately measure the modulator ER.

Thus, the present invention also features a sensitive method of measuring extinction ratio (ER) in a communication system. By plotting the peak APL output value as a function of DC and, as illustrated in FIG. 15, the peak value asymptotically approaches the ER. This is clearly illustrated in FIG. 15 and by rearranging the equation above and solving for ER as follows:

$$ER = \frac{Paverage/P_{peak} - DC}{1 - DC} \overline{\lim DC \to 0} \Rightarrow Paverage/PP_{peak}$$

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method of performing variable-bit-rate communications, the method comprising:
   a) providing a variable-bit-rate transmitter having a modulator and a net transfer function;
   b) generating digital data with the modulator of the transmitter at a first bit rate, the digital data comprising a sequence of signaling waveforms having a first duty cycle, each signaling waveform having a predetermined shape;
   c) generating digital data with the modulator of the transmitter at a second bit rate, the digital data comprising a sequence of signaling waveforms having a second duty cycle, each signaling waveform having the predetermined shape, wherein the first duty cycle and the second duty cycle differ and wherein amplitude of signaling waveforms varies as a function of duty cycle; and
   d) receiving the digital data generated at the first or the second bit rates with a variable-bit-rate receiver.

2. The method of claim 1 wherein the step of receiving the digital data comprises matching a transfer function of the variable-bit-rate transmitter to a transfer function of the variable-bit-rate receiver.

3. The method of claim 1 wherein an amplitude of each signaling waveform is inversely proportional to its duty cycle.

4. The method of claim 1 further comprising the step of transmitting the digital data generated by the variable-bit-rate transmitter through a free space or a fiber channel to the variable-bit-rate receiver.

5. The method of claim 1 wherein the sequence of signaling waveforms comprises m-ary pulse position modulation data.

6. A variable-bit-rate communication system comprising:
a) a variable-bit-rate transmitter having a modulator and a net transfer function, the modulator of the transmitter generating digital data at a first or a second bit rate, the digital data comprising a sequence of signaling waveforms having a first or a second duty cycle, respectively, wherein the first and the second duty cycle differ, wherein each signaling waveform has the same shape, wherein the variable-bit-rate transmitter is substantially average power limited thereby causing the amplitude of each signaling waveform to be inversely proportional to its duty cycle; and
b) a variable-bit-rate receiver that receives the digital data generated by the transmitter.

7. The variable-bit-rate communication system of claim 6 wherein the variable-bit-rate receiver includes a receiver filter having a transfer function that is substantially equal to the net transfer function of the transmitter.

8. The variable-bit-rate communication system of claim 7 wherein the variable-bit-rate receiver includes a multi-pass filter or a plurality of cascaded optical filters.

9. The variable-bit-rate communication system of claim 6 wherein the variable-bit-rate receiver includes a receiver filter having a transfer function that is substantially equal to a conjugate match of the net transfer function of the transmitter.

10. The variable-bit-rate communication system of claim 6 wherein the variable-bit-rate receiver includes a receiver filter and the variable-bit-rate transmitter includes a transmitter filter, wherein a transfer function of the receiver filter is substantially equal to a transfer function of the transmitter filter.

11. The variable-bit-rate communication system of claim 6 wherein the variable-bit-rate receiver includes a receiver filter and the variable-bit-rate transmitter includes a transmitter filter, wherein a transfer function of the receiver filter is substantially equal to a conjugate match of a transfer function of the transmitter filter.

12. The variable-bit-rate communication system of claim 6 further comprising a free space channel or a fiber channel for transmitting the digital data from the variable-bit-rate transmitter to the variable-bit-rate receiver.

13. A variable-bit-rate digital communication system comprising:
a) a variable-bit-rate transmitter having a net transfer function, the transmitter comprising:
i) an optical source that generates digital data at a first or a second bit rate, the digital data comprising a sequence of signaling waveforms having a first or a second duty cycle, respectively, wherein each signaling waveform has the same shape, and
ii) an optical average power limited amplifier that amplifies the sequence of signaling waveforms, each amplified signaling waveform having a maximum power that is determined by an average power limit of the amplifier and its duty cycle;
b) a channel for transmitting the amplified sequence of signaling waveforms; and
c) a variable-bit-rate receiver comprising:
i) a receiver filter that receives the digital data, the receiver filter having a receiver transfer function that is substantially equal to the net transmitter transfer function, thereby spectrally and temporally matching the transmitter to the receiver, and
ii) a detector that detects digital data.

14. The system of claim 13 wherein the channel is a free space or a fiber channel.

15. The system of claim 13 wherein the variable-bit-rate receiver further comprises an optical amplifier that amplifies the digital data.

16. The system of claim 13 wherein the optical average power limited amplifier comprises an Erbium-doped fiber amplifier.

17. The system of claim 13 wherein the receiver filter comprises an optical filter.

18. The system of claim 17 wherein the optical filter comprises a Fabry-Perot, interference, or Bragg grating optical filter.

19. The system of claim 17 wherein the optical filter comprises a symmetric filter, a multi-pass optical filter, or a plurality of cascaded optical filters.

20. The system of claim 19 wherein the multi-pass optical filter comprises a multi-pass Fabry-Perot optical filter.

21. A method of reducing a bit error rate of a digital communication system operating in a noisy channel, the method comprising:
a) providing a variable-bit-rate average power limited transmitter operating in saturation, the transmitter having a net transfer function;
b) generating digital data with the transmitter at a first bit rate, the digital data comprising a sequence of signaling waveforms having a first duty cycle, each signaling waveform having a predetermined shape and having an amplitude that is inversely proportional to its duty cycle;
c) determining that the bit error rate of the digital communication system exceeds a predetermined value;
d) generating digital data with the transmitter at a second bit rate which is lower than the first bit rate, the digital data comprising a sequence of signaling waveforms having a second duty cycle, each signaling waveform having the predetermined shape and having an amplitude that is inversely proportional to its duty cycle, wherein the second duty cycle is less than the first duty cycle thereby increasing the transmitted energy-per-bit and lowering the bit error rate; and
e) receiving the digital data generated the at first and the second bit rates with a variable-bit-rate receiver.

22. The method of claim 21 wherein the step of receiving the digital data comprises spectrally and temporally matching the variable-bit-rate transmitter to the variable-bit-rate receiver.

23. The method of claim 21 further comprising the step of transmitting the digital data generated by the variable-bit-rate transmitter through a free space channel or a fiber channel to the variable-bit-rate receiver.

24. The method of claim 21 wherein the digital data comprises an m-ary pulse position modulation format.

25. A method of optimizing variable-bit-rate communications, the method comprising:

a) providing a variable-bit-rate average power limited transmitter operating in saturation, the transmitter having a net transfer function;
b) generating digital data comprising a sequence of signaling waveforms with the transmitter at a first bit rate, the signaling waveforms at the first bit rate having a first duty cycle and a predetermined shape and having an amplitude that is inversely proportional to its duty cycle;
c) generating digital data comprising a sequence of signaling waveforms with the transmitter at a second bit rate which is lower than the first bit rate, the signaling waveforms at the second bit rate having a second duty cycle and the predetermined shape and having an amplitude that is inversely proportional to its duty cycle, the second duty cycle being less than the first duty cycle; and
d) receiving the digital data generated at the first and the second bit rates with a variable-bit-rate receiver, wherein the receiver comprises a receiver filter having a transfer function that is substantially equal to a conjugate match of the net transfer function of the transmitter thereby spectrally and temporally matching the transmitter to the receiver and receiving the digital data with optimum sensitivity.

26. The method of claim 25 wherein the digital data comprises an m-ary pulse position modulation format.

27. A method of reducing intersymbol interference in a communication system, the method comprising:
a) providing a variable-bit-rate average power limited transmitter operating in saturation, the transmitter having a net transfer function;
b) generating digital data having intersymbol interference with the transmitter at a first bit rate, the digital data comprising a sequence of signaling waveforms having a first duty cycle, each signaling waveform having a predetermined shape and having an amplitude that is inversely proportional to its duty cycle;
c) determining that the intersymbol interference of the digital data exceeds a predetermined value; and
d) generating digital data with the transmitter at a second bit rate which is lower than the first bit rate, the digital data comprising a sequence of signaling waveforms having a second duty cycle, each signaling waveform having the predetermined shape and having an amplitude that is inversely proportional to its duty cycle, wherein the second duty cycle is less than the first duty cycle, thereby increasing pulse spacing and reducing the intersymbol interference.

28. A method of performing optimal communications at one or multiple data rates using spectral filtering, the method comprising:
a) providing a variable-bit-rate average power limited transmitter having a modulator and a net transfer function;
b) providing a variable-bit-rate receiver comprising a receiver filter having a transfer function that is substantially equal to a conjugate match of the net transfer function of the transmitter;
c) generating digital data with the modulator of the transmitter at a first bit rate, the digital data comprising a sequence of signaling waveforms having a first duty cycle and a maximum power that is determined by an average power limit of the transmitter and the first duty cycle, each signaling waveform having a predetermined shape; and
d) receiving the digital data with the receiver.

29. The method of claim 28 further comprising the step of generating digital data with the transmitter at a second bit rate, the digital data comprising a sequence of signaling waveforms having a second duty cycle, each signaling waveform having the predetermined shape.

* * * * *

UNITED STATES PATENT AND TRADEMARK OFFICE
CERTIFICATE OF CORRECTION

PATENT NO. : 6,694,104 B1
DATED : March 8, 2004
INVENTOR(S) : Caplan et al.

It is certified that error appears in the above-identified patent and that said Letters Patent is hereby corrected as shown below:

Column 14,
Line 38, Step (c) of claim 1, should read as follows:
  generating digital data with the modulator of the transmitter at a second bit rate, the digital data comprising a sequence of signaling waveforms having a second duty cycle, each signaling waveform having the predetermined shape, wherein the first duty cycle and the second duty cycle differ and wherein an amplitude of each signaling waveform is inversely proportional to its duty cycle; and Signed and Sealed this Twenty-ninth Day of June, 2004

JON W. DUDAS
*Acting Director of the United States Patent and Trademark Office*